(12) United States Patent
Chen et al.

(10) Patent No.: US 10,877,776 B2
(45) Date of Patent: Dec. 29, 2020

(54) METHOD, DEVICE AND COMPUTER PROGRAM PRODUCT FOR PERFORMING APPLICATIONS IN HYBRID CLOUD

(71) Applicant: Dell Products L.P., Round Rock, TX (US)

(72) Inventors: Fei Chen, Beijing (CN); Fucai Liu, Beijing (CN); Kun Wang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 16/244,937

(22) Filed: Jan. 10, 2019

(65) Prior Publication Data

US 2019/0220292 A1 Jul. 18, 2019

(30) Foreign Application Priority Data

Jan. 18, 2018 (CN) .......................... 2018 1 0050266

(51) Int. Cl.
*G06F 9/445* (2018.01)
*G06F 9/48* (2006.01)
(Continued)

(52) U.S. Cl.
CPC ............ *G06F 9/44547* (2013.01); *G06F 8/64* (2013.01); *G06F 9/44542* (2013.01);
(Continued)

(58) Field of Classification Search
CPC ..... H04L 67/1097; H04L 67/00; H04L 67/04; H04L 67/1008; H04L 67/1023; H04L 67/20; H04L 67/2823; H04L 67/2833; H04L 67/2838; H04L 67/34; G06F 3/067; G06F 9/4881; G06F 9/45533; G06F 9/542; G06F 9/00; G06F 9/4411; G06F 9/44505; G06F 9/44526; G06F 9/5033;
(Continued)

(56) References Cited

U.S. PATENT DOCUMENTS

| 8,656,023 B1 * | 2/2014 | Ho ........................ G06F 9/5072 709/226 |
| 2015/0205587 A1 * | 7/2015 | Bates .................... G06F 9/4552 717/148 |

(Continued)

*Primary Examiner* — Glenton B Burgess
*Assistant Examiner* — Rachel J Hackenberg
(74) *Attorney, Agent, or Firm* — Ryan, Mason & Lewis, LLP

(57) ABSTRACT

Embodiments of the present disclosure provide a method, device and computer program product for executing applications in a hybrid cloud. The method comprises in response to receiving a request for executing the application from a user, obtaining an application identifier for the application from the request. The method also comprises determining, based on the application identifier and a scheduling strategy associated with the application, an executable file identifier corresponding to the application. The method further comprises obtaining, from a repository associated with the hybrid cloud, an executable file of the application corresponding to the executable file identifier, the executable file being associated with a type of a heterogeneous device in a hybrid cloud. By utilizing the above method, users can rapidly execute the application without considering the type of the heterogeneous device in the hybrid cloud.

20 Claims, 7 Drawing Sheets

(51) Int. Cl.
*G06F 9/50* (2006.01)
*H04L 12/24* (2006.01)
*H04L 29/08* (2006.01)
*G06F 8/61* (2018.01)

(52) U.S. Cl.
CPC .......... *G06F 9/4881* (2013.01); *G06F 9/5072* (2013.01); *H04L 41/0803* (2013.01); *H04L 67/10* (2013.01); *H04L 67/34* (2013.01)

(58) Field of Classification Search
CPC ...... G06F 9/5055; G06F 9/5088; G06F 9/544; G06F 9/505; G06F 9/45558; G06F 9/5038; G06F 9/46; G06F 9/5016; G06F 9/5072; G06F 9/5077; G06F 2201/84; G06F 2209/485; G06F 2009/45579; G06F 2009/45583; G06F 2009/45591; G06F 2009/45595
See application file for complete search history.

(56) References Cited

U.S. PATENT DOCUMENTS

| | | | |
|---|---|---|---|
| 2015/0317192 A1* | 11/2015 | Munshi | G06F 8/41 719/328 |
| 2017/0097851 A1* | 4/2017 | Chen | G06F 9/5077 |
| 2017/0212777 A1* | 7/2017 | Tamura | G06F 9/45558 |
| 2018/0007059 A1* | 1/2018 | Innes | H04L 63/107 |
| 2018/0101324 A1* | 4/2018 | Sharma | G06F 3/0608 |
| 2018/0113625 A1* | 4/2018 | Sancheti | G06F 3/065 |

* cited by examiner

METHOD, DEVICE AND COMPUTER PROGRAM PRODUCT FOR PERFORMING APPLICATIONS IN HYBRID CLOUD

RELATED APPLICATION(S)

The present application claims priority to Chinese Patent Application No. 201810050266.5, filed Jan. 18, 2018 and entitled "Method, Device and Computer Program Product for Performing Applications in Hybrid Cloud," which is incorporated by reference herein in its entirety.

FIELD

Embodiments of the present disclosure generally relate to the field of devices for execution of applications in a cloud, and more specifically, to a method, device and computer program product for executing applications in a hybrid cloud.

BACKGROUND

With the rapid development of the network technology, cloud technology has been applied to many fields to serve society. Based on the different cloud users and different ranges, cloud service can be divided into public cloud service and private cloud service. Today there are already many public clouds for users to use in the world, and users can rapidly improve the execution efficiency of an application by deploying the application on the cloud for operation. These public clouds can provide resources, such as CPU, memory and the like to the users for use. Meanwhile, many users also establish their own private clouds to ensure data or information security. However, the use of private clouds will be restricted by factors such as cost, performance and so on.

As the users utilizing the cloud service increase and the user demands grow, the cloud service providers also begin to provide hardware devices, such as GPU and FPGA devices, in addition to the service of CPU and memory resources, to satisfy user needs. Although the apparatus on the cloud device, such as GPU, FPGA and the like, can satisfy needs of many users, there are many enterprises that manufacture GPU and FPGA devices. Accordingly, GPU or FPGA devices between different enterprises are not compatible, and even for different types of GPUs manufactured by the same enterprise, their internal structures are different due to different types. Therefore, it causes a problem in that that users cannot compatibly utilize the heterogeneous devices in different clouds to process their applications.

SUMMARY

Embodiments of the present disclosure provide a method, device and computer program product for executing applications in a hybrid cloud.

According to the first aspect of the present disclosure, there is provided a method of executing an application in a hybrid cloud. The method comprises in response to receiving a request for executing the application from a user, obtaining an application identifier for the application from the request. The method also comprises determining, based on the application identifier and a scheduling strategy associated with the application, an executable file identifier corresponding to the application. The method further comprises obtaining, from a repository associated with the hybrid cloud, an executable file of the application corresponding to the executable file identifier, the executable file being associated with a type of a heterogeneous device in a hybrid cloud.

In some embodiments, determining the executable file identifier comprises: determining, based on the application identifier and the scheduling strategy, a cloud identifier and a device identifier from metadata, respectively, the metadata at least comprising the application identifier, the cloud identifier, the device identifier and information related to device performance, a usage cost and security; determining the executable file identifier from the repository based on the application identifier, the cloud identifier and the device identifier.

In some embodiments, the method further comprises: deploying the executable file to a heterogeneous device in the hybrid cloud to obtain an execution result snapshot of the application; and determining an output of the application based on an initial snapshot of the application and the execution result snapshot of the application.

In some embodiments, the method further comprises: in response to an application installation request from the user, obtaining source code of the application; obtaining a type of the heterogeneous device in the hybrid cloud from configuration information of the hybrid cloud; generating, based on the type of the heterogeneous device, the executable file corresponding to the type of the heterogeneous device; and storing the executable file in the repository.

In some embodiments, storing the executable file in the repository comprises: storing the executable file in the repository in association with at least one of: an application identifier, an executable file identifier, a cloud identifier and a heterogeneous device identifier.

In some embodiments, the method further comprises: in response to the generation of the executable file, storing metadata of the application in metadata storage of a hybrid cloud tool, the metadata at least comprising an application identifier, a cloud identifier, a device identifier and information related to device performance, a usage cost, and security.

In some embodiments, the method further comprises: verifying the user based on account information of the user and the application identifier.

In some embodiments, the method further comprises: determining a current scheduling strategy based on at least one of a scheduling strategy previously used for the application by the user and a scheduling strategy used for the application by a further user.

According to a second aspect, there is provided an electronic device for executing an application in a hybrid cloud. The electronic device comprises: a processor; and a memory having computer program instructions stored thereon, the processor executing the computer program instructions in the memory to control the electronic device to perform actions. The actions include: in response to receiving a request for executing the application from a user, obtaining an application identifier for the application from the request. The actions also include determining, based on the application identifier and a scheduling strategy associated with the application, an executable file identifier corresponding to the application. The actions also include obtaining, from a repository associated with the hybrid cloud, an executable file of the application corresponding to the executable file identifier, the executable file being associated with a type of a heterogeneous device in the hybrid cloud.

In some embodiments, determining the executable file identifier comprises: determining, based on the application identifier and the scheduling strategy, a cloud identifier and a device identifier from metadata, respectively, the metadata at least comprising the application identifier, the cloud identifier, the device identifier and information related to device performance, a usage cost and security; determining the executable file identifier from the repository based on the application identifier, the cloud identifier and the device identifier.

In some embodiments, the actions also comprise: deploying the executable file to a heterogeneous device into the hybrid cloud to obtain an execution result snapshot of the application; and determining an output of the application based on an initial snapshot of the application and the execution result snapshot of the application.

In some embodiments, the actions also comprise: in response to an application installation request from a user, obtaining source code of the application; obtaining a type of the heterogeneous device in the hybrid cloud from configuration information of the hybrid cloud; generating, based on the type of the heterogeneous device and from the source code, the executable file corresponding to the type of the heterogeneous device; and storing the executable file in the repository.

In some embodiments, storing the executable file in the repository comprises: storing the executable file in the repository in association with at least one of: an application identifier, an executable file identifier, a cloud identifier and a heterogeneous device identifier.

In some embodiments, the actions further comprise: in response to the generation of the executable file, storing metadata of the application in a metadata storage of a hybrid cloud tool, the metadata at least comprising an application identifier, a cloud identifier, a device identifier and information related to device performance, a usage cost and security.

In some embodiments, the actions further comprise: verifying the user based on account information of the user and the application identifier.

In some embodiments, the actions further comprise: determining a current scheduling strategy based on at least one of a scheduling strategy previously used for the application by the user and a scheduling strategy used for the application by further users.

According to a third aspect of the present disclosure, there is provided a computer program product. The computer program product is tangibly stored on a non-volatile computer readable medium and comprises machine-executable instructions, which, when executed, cause a machine to perform the steps of the method according to the first aspect of the present disclosure.

BRIEF DESCRIPTION OF THE DRAWINGS

Through the more detailed description of example embodiments of the present disclosure with reference to the accompanying drawings, the above and other objectives, features, and advantages of the present disclosure will become more apparent, wherein the same reference signs in the example embodiments of the present disclosure usually represent the same components.

Figure 1:
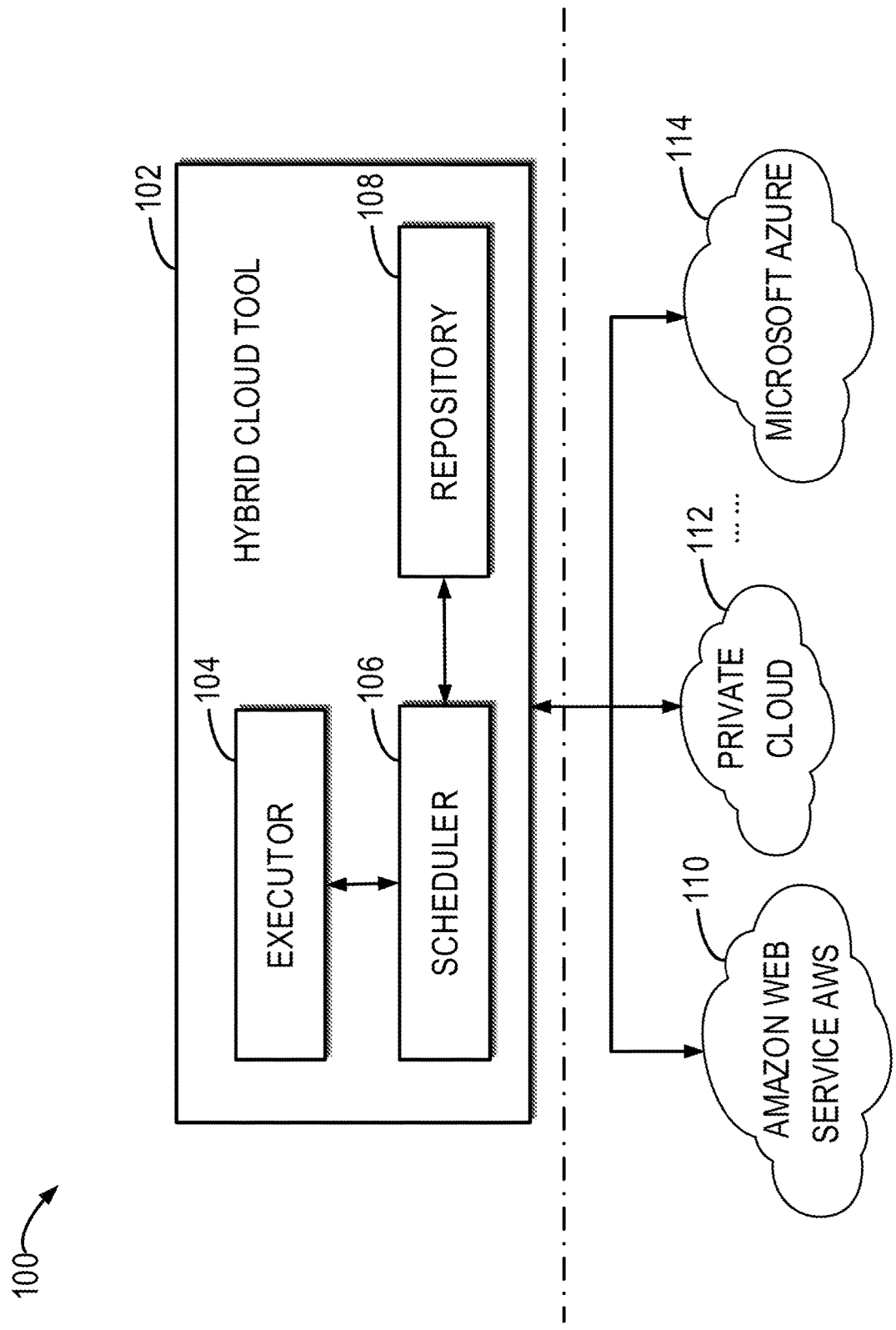
FIG. 1 illustrates a schematic diagram of an example environment 100 in which a device and/or method for executing applications in a hybrid cloud can be implemented according to the embodiments of the present disclosure.

In each drawing, the same or corresponding signs indicate the same or corresponding components.

DETAILED DESCRIPTION

The embodiments of the present disclosure will be described in more detail with reference to the drawings. Although the drawings illustrate some embodiments of the present disclosure, it should be appreciated that the present disclosure can be implemented in various manners and should not be limited to the embodiments described herein. On the contrary, the embodiments are provided to understand the present disclosure in a more thorough and complete way. It should be appreciated that drawings and embodiments of the present disclosure are only for exemplary purposes rather than restricting the protection scope of the present disclosure.

In description of the embodiments of the present disclosure, the term "includes" and its variants are to be considered as open-ended terms that mean "includes, but is not limited to." The term "based on" is to be understood as "based at least in part on." The term "one embodiment" or "the embodiment" is to be read as "at least one embodiment." The terms "first," "second" and so on can refer to same or different objects. The following text can comprise other explicit and implicit definitions.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and are not intended for limiting the scope of the present disclosure in any manner.

Because the type of the heterogeneous device, such as GPU, FPGA and the like, differs in different clouds, users, while using the heterogeneous device, normally need to generate different executable files for different heterogeneous devices by themselves according to the type of the heterogeneous device in the cloud, and run the programs on the heterogeneous device using the executable file. Since the users are required to participate in the generation of each executable file, it reduces the efficiency of using the heterogeneous device to a great extent.

In addition, as the current cloud is becoming larger and the heterogeneous devices therein are increasing, users may fail to realize generating a corresponding executable file for each heterogeneous device respectively.

Therefore, the present disclosure provides a technical solution of generating and configuring an executable file to be utilized for users using a hybrid cloud tool, which is transparent for the users. In the technical solution, it respectively generates an executable file of an application corresponding to the type of the heterogeneous device in the hybrid cloud tools for different types of heterogeneous devices in the hybrid cloud, and stores the executable file in a repository for use when users execute the application. Accordingly, for different types of heterogeneous devices, a corresponding executable file can be directly acquired from the repository without the user participation when the application is being executed. Therefore, users can compatibly employ different heterogeneous devices to execute the application, thereby improving the efficiency of utilizing the heterogeneous device in the hybrid cloud by the users.

FIG. 1 illustrates a schematic diagram of an example environment 100 in which the device and/or method for executing applications in a hybrid cloud can be implemented according to the embodiments of the present disclosure. In the environment, there is hybrid cloud, such as private cloud 112, Amazon web service 110, Microsoft Azure 114 shown in FIG. 1 and the like. It should be noted that the cloud shown in FIG. 1 is only exemplary and is not intended for limiting the hybrid cloud. The hybrid cloud can include any number of clouds.

There are heterogeneous devices for use by the users in the hybrid cloud. In one example, the heterogeneous devices refer to different types of devices with the same function, for example, the frequently used GPU and FPGA devices in the cloud service. Compared with CPU, GPU and FPGA devices usually have a plurality of models and types because there are many manufacturers of GPU and FPGA devices and the type generated by each manufacturer is constantly changing. Due to different manufacturers or different models, the internal structure of different heterogeneous devices always differs. Therefore, for the heterogeneous devices in the cloud, if the application is expected to run on the heterogeneous devices, it is required to generate corresponding executable files respectively for different types of heterogeneous devices.

A hybrid cloud tool 102 at least includes an executor 104, a scheduler 106 and a repository 108. The hybrid cloud tool 102 receives from the users a request for executing an application, and then deploys an executable file of the application corresponding to the type of the heterogeneous device in the cloud into the cloud. In one embodiment, the hybrid cloud tool 102 can be configured on the computing device of the users. In another embodiment, the hybrid cloud tool can be configured on a server. In addition, the hybrid cloud tool can be connected to the cloud in various manners. In one example, the hybrid cloud tool is connected via a network to each cloud in the hybrid cloud.

The executor 104 is used for receiving a request for executing an application from the users, and then at least acquires an identifier of an application to be executed from the request. In one example, the user request further includes a file or data that utilizes the application. Alternatively or additionally, the user request also includes some parameters. In one example, the parameters can be default parameters of the application. In a further example, at least a part of the parameters can be set by the users.

The scheduler 106 receives from the executor 104 the identifier of the application. Then, the scheduler selects, based on the received application identifier and a certain scheduling strategy, an executable file identifier from the repository 108, wherein the executable file identifier is an executable file that can be used for the application of the heterogeneous device in the hybrid cloud. In one example, the scheduling strategy in the hybrid cloud tool is preconfigured for the users. In a further example, the scheduling strategy is determined by the users. In another example, the scheduling strategy is determined by the hybrid cloud tool based on a learning algorithm. Alternatively or additionally, the hybrid cloud tool can determine the scheduling strategy of the current application based on the scheduling strategy previously used by the users for the hybrid cloud tool. Alternatively or additionally, the hybrid cloud tool also can determine the current scheduling strategy of the users based on the scheduling strategy of the application used by other users.

In one example, the scheduling strategy is associated with the cost of the application using the heterogeneous device, performance of the heterogeneous device, data security and the like. Alternatively or additionally, the scheduling strategy can be determined, e.g., time spent, cost and so on according to the needs of the users in a certain aspect.

The scheduler 106 also can acquire, from the repository 108, the application executable file corresponding to the identifier of the application. Afterwards, the hybrid cloud tool deploys the executable file into the heterogeneous device in the cloud, to execute the application by using different types of heterogeneous devices.

The repository 108 is used for storing the executable file of the application. To facilitate searching the executable file, the repository 108 is also stored with an application identifier associated with the generated executable file, an executable file identifier, a cloud identifier and device identifier information. Alternatively, the corresponding application identifier, executable file identifier, cloud identifier and device identifier are stored in the repository 108 as one piece of information. Alternatively or additionally, this piece of information also can include other information users need to store.

The above text describes the example environment 100 in which the hybrid cloud tool is applied. A method 200 for executing an application in the hybrid cloud according to embodiments of the present disclosure shown in FIG. 2 will be described with reference to the example environment shown in FIG. 1.

When the users need to execute the application in the hybrid cloud, they issue a request for utilizing the application to the hybrid cloud tool via a user interface. The request includes an application identifier of the application the users expect to use.

At block 202, the executor 104 of the hybrid cloud tool 102 first determines whether to receive a request for executing the application from the users. After receiving the request for executing the application from the users, an application identifier for the application can be obtained from the request at block 204. Alternatively or additionally, the request from the users also can include a file or data that uses the program and/or parameter information associated with the program. Alternatively or additionally, the parameter can be input by the users or configured by the system.

In one example, the user is verified based on account information of the user and the application identifier when a user's request is received. In one example, the level of the user is determined by verifying the user, the level being associated with the resources available for the user.

After acquiring the application identifier of the application, the executor 104 transmits the application identifier to the scheduler 106. At block 206, the scheduler 106 receives the application identifier and determines, based on the application identifier and the scheduling strategy associated with the application, an executable file identifier corresponding to the application from the repository 108. The procedure of how the scheduler 106 determines the executable file identifier will be further described in the following description.

In one example, the scheduling strategy used by the scheduler 106 is determined by the users. Alternatively or additionally, the scheduling strategy is included in a user's request for executing the application. In a further example, the scheduling strategy is preconfigured in the hybrid cloud tool. Alternatively or additionally, the scheduling strategy is preconfigured based on the level of the user or other information of the user.

In another example, the scheduling strategy can be determined based on the scheduling strategy previously used by the users for the program or the scheduling strategy used by other users for the program.

In a further example, the scheduling strategy is associated with cost of the application using the heterogeneous device, performance of the heterogeneous device, or data security and the like. After determining the identifier of the executable file of the application, the scheduler 106 obtains, from the repository 108, the executable file corresponding to the executable file identifier at block 208, wherein the executable file acquired from the repository 108 is the executable file of the application associated with the type of the heterogeneous device in the hybrid cloud.

Afterwards, the hybrid cloud tool 102 deploys the acquired executable file into the cloud and implements the running of the application in the hybrid cloud by executing the executable file in the heterogeneous device of the cloud. Through automatically generating the executable files for different types of heterogeneous devices by the hybrid cloud tool according to the users' needs, the users can directly use different heterogeneous devices to execute the application without considering the type of the heterogeneous device in the cloud, i.e., it is transparent to the users that the hybrid cloud tool generates different executable files for different types of heterogeneous devices. Accordingly, it avoids the issue that users are required to participate in the generation of the executable files for different types of heterogeneous devices when the users use different heterogeneous devices, which enhances the efficiency of using the hybrid cloud by the users.

Figure 2:
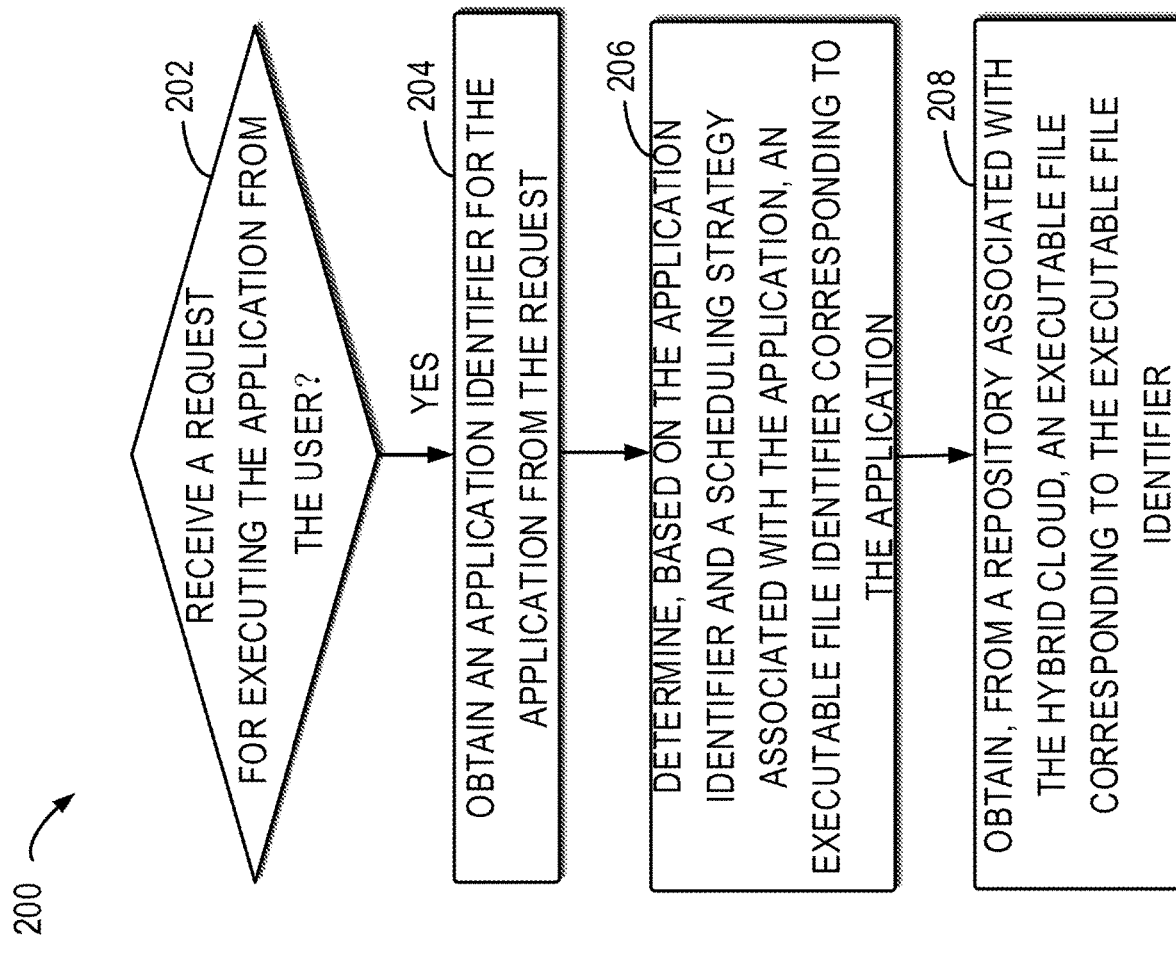
FIG. 2 illustrates a flowchart of a method 200 for executing an application in the hybrid cloud according to embodiments of the present disclosure.

FIG. 2 describes a procedure in which the users acquire the application executable file through the hybrid cloud tool 102 in FIG. 1. In order to describe the procedure of executing the executable file of the program in more details, a further example scenario 300 is described in FIG. 3.

Figure 3:
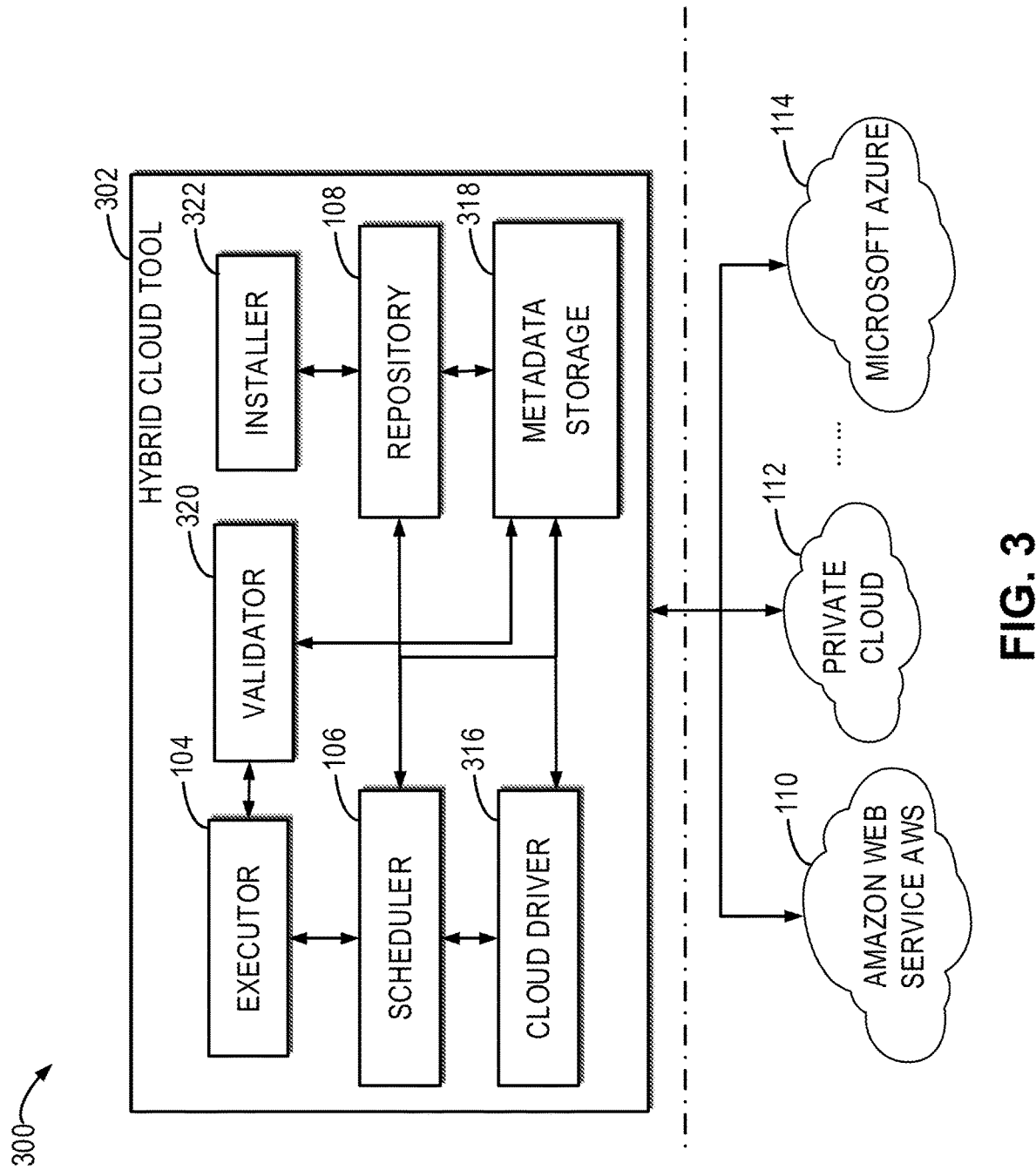
FIG. 3 illustrates a schematic diagram of a further example environment 300 in which a device and/or method can be implemented according to embodiments of the present disclosure.

FIG. 3 illustrates a schematic diagram of a further example environment 300 in which a device and/or method according to embodiments of the present disclosure can be implemented. Compared to the hybrid cloud tool 102 shown in FIG. 1, the hybrid cloud tool 302 as shown in FIG. 3 also includes an installer 322, a metadata storage 318, a validator 320 and a cloud driver 316, in addition to the executor 104, the scheduler 106 and the repository 108. In addition, as the clouds 110, 112 and 114 of FIG. 3 have been previously described with reference to FIG. 1, such description will not be repeated here.

The installer 322 is used for receiving a request of the user for installing an application and converting the received source code of the applications into executable files corresponding to the types of the heterogeneous devices in the hybrid cloud. In one example, the hybrid cloud tool 302 is also provided with a configurator, which stores configuration information of each cloud in the cloud connected with the hybrid cloud tool 302, for example, including identification information of the heterogeneous device in each cloud, the type of the heterogeneous device and so on. Alternatively or additionally, the configuration information also includes account-related information for logging in each cloud, so as to facilitate the hybrid cloud tool 302 to log in each cloud. The installer 322 acquires the type information of the heterogeneous device from the configurator.

The executable file of the application generated by the installer 322 is stored in the repository 108, and the application identifier, the executable file identifier, the cloud identifier and the device identifier are also stored in the repository 108.

The metadata of the application is stored in the metadata storage 318. The metadata at least includes the application identifier, cloud identifier, device identifier and information related to device performance, usage cost and/or security, or the like. In one example, the metadata can include the following information: the application identifier, cloud A, device A and cost per hour per data size. Alternatively or additionally, the metadata also can include the application identifier, cloud identifier, device identifier, clock frequency, power consumption and the like. Alternatively or additionally, the metadata can include the account information associated with the users. Alternatively or additionally, the metadata can include user level information corresponding to the application identifier and the user account, and the level information can determine which types of devices can be used by the users.

The cloud driver 316 is used for deploying the executable file of the application into the hybrid cloud. In one example, the cloud driver 316 logs in the cloud using the cloud account information from the configurator, and interacts with the cloud. The cloud driver 316 can be used for creating a virtual machine to execute the application in the cloud. The cloud driver 316 deploys the executable file of the application into the heterogeneous device of a corresponding cloud.

Figure 4:
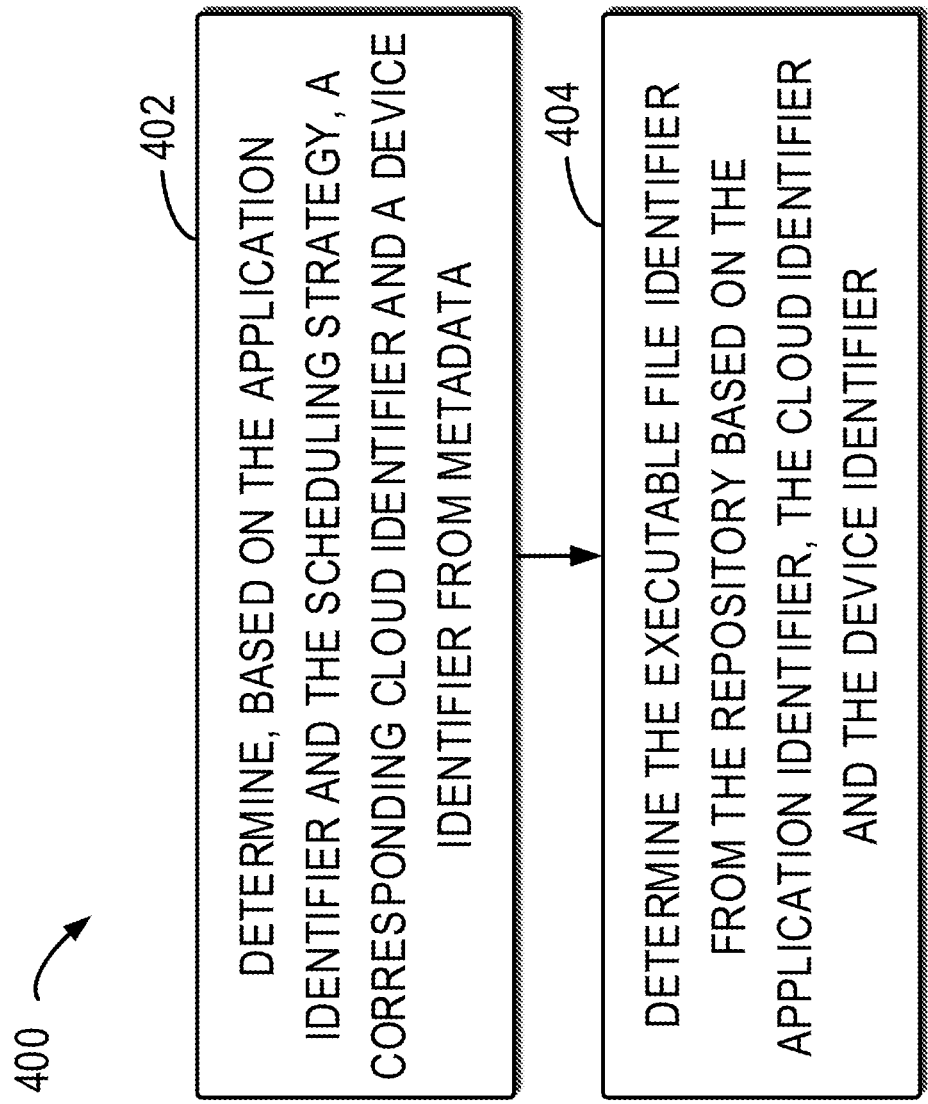
FIG. 4 illustrates a flowchart of a further method 400 for executing an application in the hybrid cloud according to embodiments of the present disclosure.

The procedure of determining the executable file identifier will be further described in detail in FIG. 4 with reference to FIG. 3. It should be understood that the procedure shown in FIG. 4 is an implementation of the block 206 in FIG. 2. However, this is only exemplary and is not intended for restricting the present disclosure in any manner.

After the scheduler 106 receives the application identifier and the scheduling strategy, the scheduler 106 will acquire metadata information associated with the application identifier from the metadata storage 318.

FIG. 4 illustrates method 400 for executing an application in the hybrid cloud according to embodiments of the present disclosure.

At block 402, the scheduler 106 determines, based on the application identifier and the scheduling strategy, the corresponding cloud identifier and the device identifier from the metadata. Just as an example, the metadata at least includes the application identifier, the cloud identifier, the device identifier and information related to the performance of the device, the usage cost and the security.

As an example, when the cloud identifier and the device identifier are determined, the cloud and the heterogeneous device that satisfy the conditions can be selected from the metadata based on the strategy used by the users for saving time or saving cost. Alternatively or additionally, it can sort the information associated with runtime or cost of the device in the metadata, so as to determine the cloud and the heterogeneous device in the cloud that satisfy the user's need.

After determining the cloud identifier and the device identifier, an executable file identifier can be determined from the repository 108 based on the application identifier, the cloud identifier and the device identifier at block 404.

The above contents specifically describe the procedure of how to acquire the executable file identifier. By the above method, an executable file identifier of the executable file corresponding to the suitable heterogeneous device can be determined. Accordingly, users can determine the suitable heterogeneous device according to their needs. Besides, the target file can be rapidly determined by the hybrid cloud tool using the correlation between these identifiers and the strategy.

The above FIG. 4 describes the procedure of acquiring the executable file identifier of the application. After acquiring the executable file identifier, the scheduler 106 can acquire the executable file from the repository 108 via the executable file identifier, and then the hybrid cloud tool transmits the executable file of the application into the hybrid cloud for execution. The procedure of how to run the executable file in the cloud will be further described in detail in FIG. 5 with reference to the architecture shown in FIG. 3.

The scheduler 106, after acquiring the executable file of the application, transmits the executable file to the cloud driver 316.

The cloud driver 316, after deploying the executable file to the heterogeneous device in the hybrid cloud, reads an initial snapshot of the application from the cloud. In an example, the initial snapshot is a snapshot of a file list associated with the application after the completion of the deployment.

Figure 5:
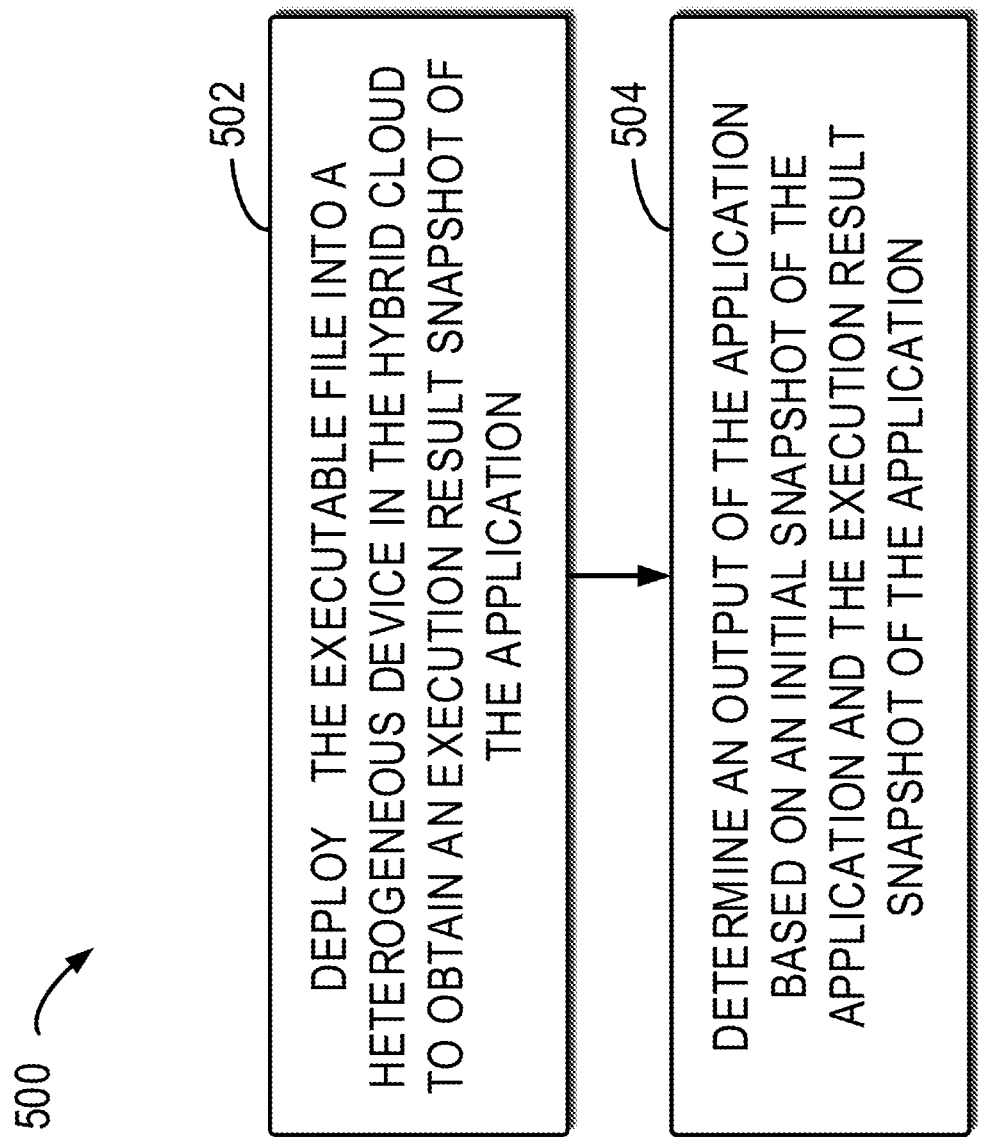
FIG. 5 illustrates a flowchart of a further method 500 for executing an application in the hybrid cloud according to embodiments of the present disclosure.

FIG. 5 illustrates method 500 for executing an application in the hybrid cloud according to embodiments of the present disclosure.

At block 502, the cloud driver 316 deploys the executable file into the heterogeneous device in the hybrid cloud. After operating the executable file, a snapshot of an execution result of the application is also read from the cloud. In an example, the execution result snapshot is a snapshot of a file list associated with the application after the application execution is completed.

After receiving the execution result snapshot of the application, the hybrid cloud tool compares the execution result snapshot with the initial snapshot of the application. At block 504, an output of the application is determined based on the initial snapshot of the application and the execution result snapshot of the application. In an example, the files corresponding to different file identification information in the snapshot, i.e., the altered files in operation, serve as the result output of the running application. Alternatively or additionally, the read snapshot data is stored in the metadata storage 318. In a further example, the read snapshot data can be stored in other specified positions based on the user's need.

By acquiring the output result of the application via executing the above comparison, the hybrid cloud tool can quickly determine which files and data change, and then accurately return the output result to the users. Because the above operations are automatically processed by the hybrid cloud tool, it improves the efficiency of acquiring the execution result.

The above contents describe the procedure of executing the application. The procedure of generating the executable file of the application in the hybrid cloud tool will be described in FIG. 6 with reference to FIG. 3.

Before the users execute the application in the hybrid cloud tool, the application should be installed on the hybrid cloud tool.

Figure 6:
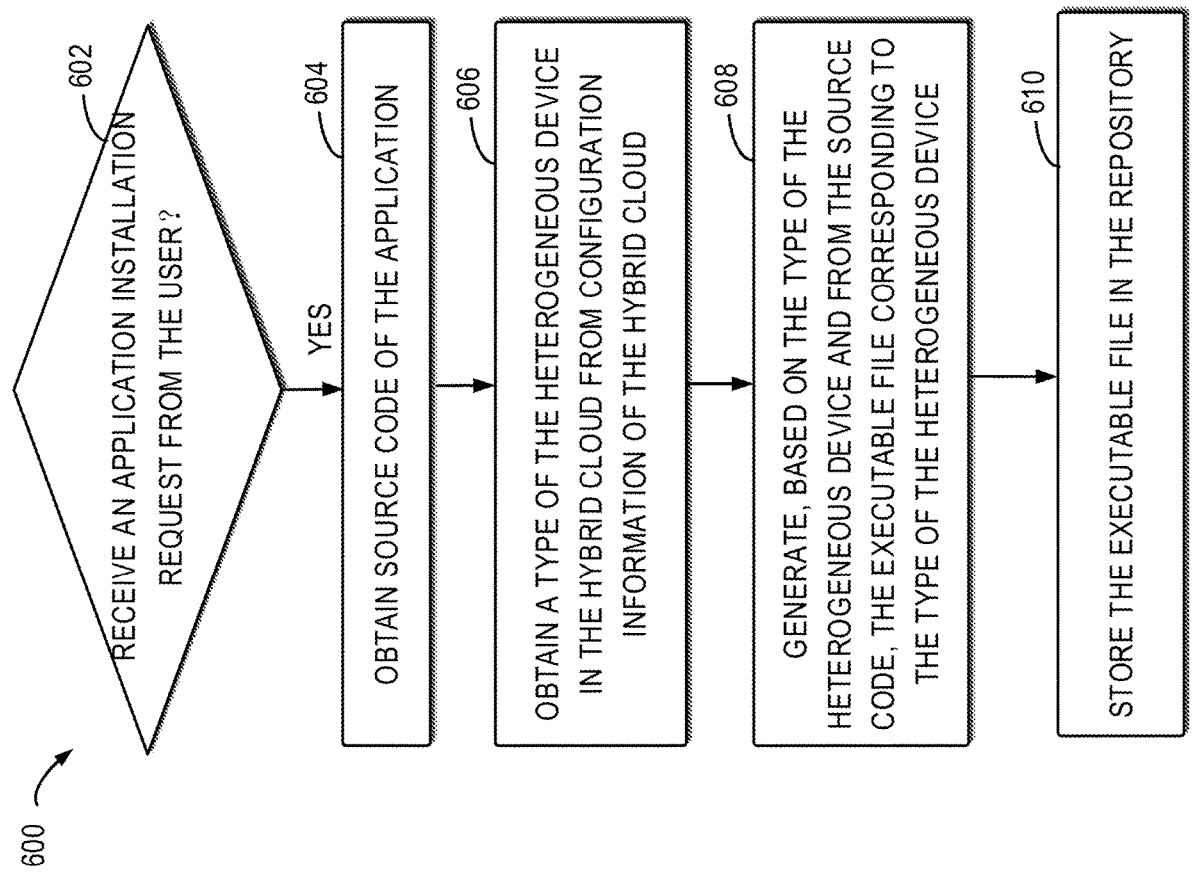
FIG. 6 illustrates a flowchart of a further method 600 for executing an application in the hybrid cloud according to embodiments of the present disclosure.

FIG. 6 illustrates method 600 for executing an application in the hybrid cloud according to embodiments of the present disclosure.

At block 602, the installer 322 first determines whether an application installation request is received from the users. After receiving the application installation request from the users, the source code of the application is obtained at block 604. In one example, the source code of the application is stored locally and the hybrid cloud tool can directly obtain the source code. Alternatively or additionally, the source code can be acquired from any suitable devices based on the user's requirements.

At block 606, the installer 322 obtains the type of the heterogeneous device in the hybrid cloud from the configuration information of the hybrid cloud. In one example, the hybrid cloud tool also includes a configurator in which the configuration information of the hybrid cloud is stored. In one example, the configuration information is acquired by the hybrid cloud tool scanning the hybrid cloud connected thereto.

At block 608, after acquiring the type of the heterogeneous device, the source code is generated into the executable file corresponding to the type of the heterogeneous device based on the type of the heterogeneous device.

At block 610, after generating the executable file, the executable file is stored in the repository 108.

During the procedure of installing the programs, different executable files are generated for the type of the heterogeneous device in the hybrid cloud, and a plurality of different executable files is stored in the repository 108. This procedure makes a plurality of executable files of the application pre-stored for the heterogeneous devices in different clouds prior to using the application, such that the users can directly use the corresponding executable file without further processing when using the heterogeneous device, which enhances the efficiency of acquiring the executable file.

FIG. 6 describes a procedure of generating the executable file and storing the executable file in the repository 108. To facilitate searching the executable file, the executable file is stored in the repository 108 associatively with at least one of: the application identifier, executable file identifier, cloud identifier and heterogeneous device identifier. Alternatively or additionally, the users also can store other information based on the needs.

To better manage the executable file of the application, the metadata of the application is stored in the metadata storage 318 of the hybrid cloud tool after generating the executable file. The metadata at least includes the application identifier, cloud identifier, device identifier and information associated with device performance, usage cost and security. In one example, the metadata can include information such as: the application identifier, cloud A, device A and cost per hour per data size. Alternatively or additionally, the metadata also can include the application identifier, cloud identifier, device identifier, clock frequency, power consumption and the like. Alternatively or additionally, the metadata can include the account information associated with the users. In one example, the metadata can include usage level information corresponding to the application identifier and the user account.

Figure 7:
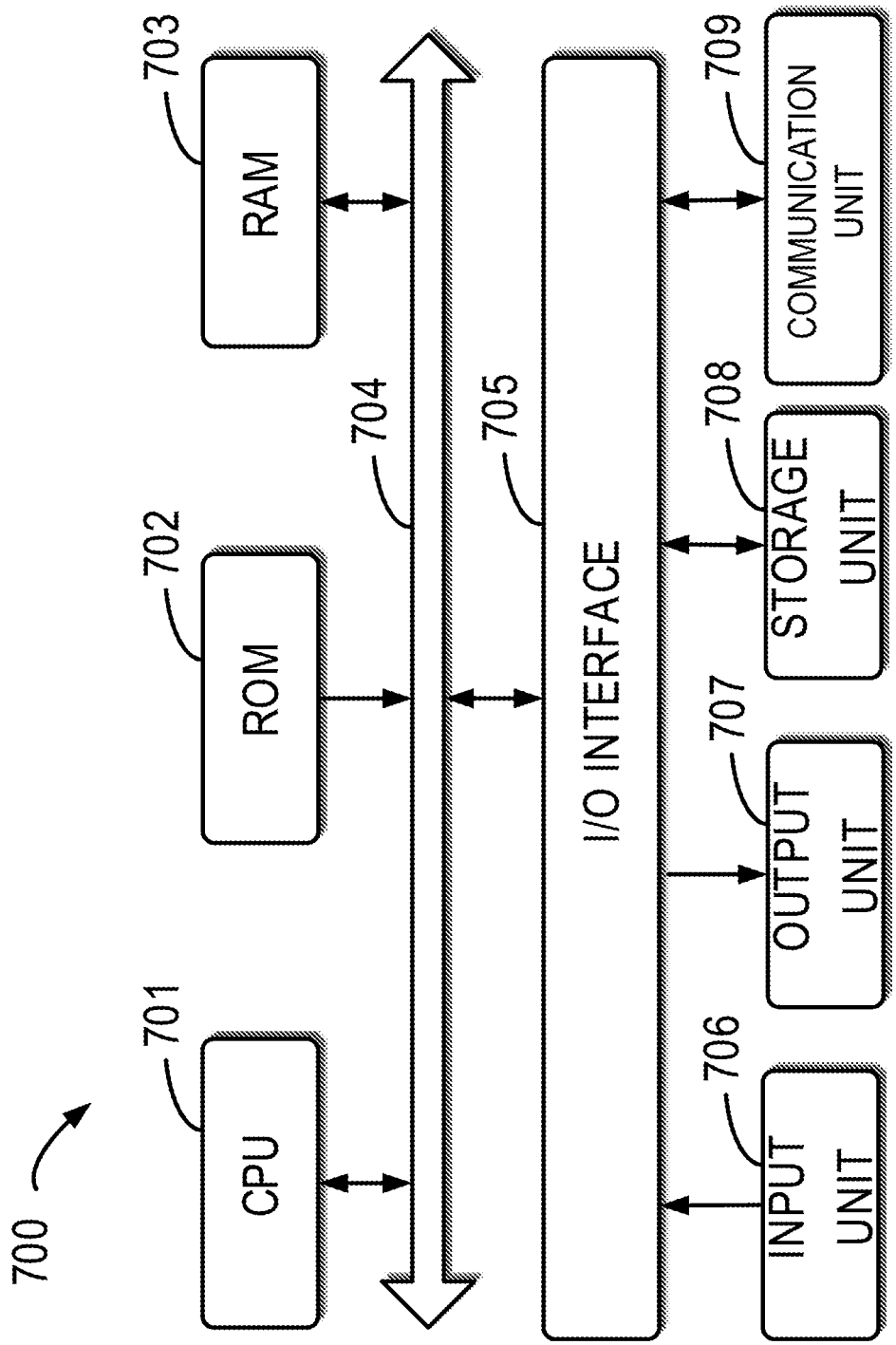
FIG. 7 illustrates a schematic block diagram of an example device 700 suitable for implementing embodiments of the present disclosure.

FIG. 7 illustrates a schematic block diagram of an example device 700 for implementing embodiments of the present disclosure. For example, any of 102, 104 and 108 shown in FIGS. 1 and 316, 318, 320 and 322 shown in FIG. 3 can be implemented by the device 700. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described procedures and processing, such as methods 200, 400, 500 and 600, can also be executed by the CPU 701. For example, in some embodiments, the methods 200, 400, 500 and 600 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more actions of the above described methods 200, 400, 500 or 600 can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source code or target code written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, and otherwise enable those of ordinary skill in the art to understand implementations of the present disclosure.

What is claimed is:

1. A method of executing an application in a hybrid cloud, comprising:
   in response to receiving a request for executing the application from a user, obtaining an application identifier for the application from the request;
   determining, based on the application identifier and a scheduling strategy associated with the application, an executable file identifier corresponding to the application; and
   obtaining, from a repository associated with the hybrid cloud, an executable file of the application corresponding to the executable file identifier, the executable file being associated with a type of a heterogeneous device in the hybrid cloud;
   wherein determining the executable file identifier comprises:
      determining, based on the application identifier and the scheduling strategy, a cloud identifier and a device identifier from metadata, the metadata comprising the application identifier, the cloud identifier, the device identifier and information related to at least one of device performance, a usage cost, and security; and
      determining the executable file identifier from the repository based on the application identifier, the cloud identifier and the device identifier.

2. The method of claim 1, further comprising:
   deploying the executable file into a heterogeneous device in the hybrid cloud to obtain an execution result snapshot of the application; and
   determining an output of the application based on an initial snapshot of the application and the execution result snapshot of the application.

3. The method of claim 2, wherein the execution result snapshot of the application comprises a snapshot of a file list associated with the application after the application execution is completed.

4. The method of claim 3, wherein determining the output of the application based on the initial snapshot of the application and the execution result snapshot of the application comprises identifying at least one of files and data altered in operation of the application based on the file list associated with the application after the application execution is completed.

5. The method of claim 1, further comprising:
   in response to an application installation request from the user, obtaining source code of the application;
   obtaining a type of the heterogeneous device in the hybrid cloud from configuration information of the hybrid cloud;
   generating, based on the type of the heterogeneous device and from the source code, the executable file corresponding to the type of the heterogeneous device; and
   storing the executable file in the repository.

6. The method of claim 5, wherein storing the executable file in the repository comprises:
   storing the executable file in the repository in association with at least one of the application identifier, the executable file identifier, the cloud identifier and the device identifier.

7. The method of claim 5, further comprising:
   in response to the generation of the executable file, storing the metadata of the application in metadata storage of a hybrid cloud tool, the metadata comprising the application identifier, the cloud identifier, the device identifier and the information related to at least one of device performance, a usage cost, and security.

8. The method of claim 1, further comprising:
   verifying the user based on account information of the user and the application identifier.

9. The method of claim 1, further comprising:
   determining a current scheduling strategy based on at least one of a scheduling strategy previously used for the application by the user and a scheduling strategy used for the application by a further user.

10. The method of claim 1, wherein the executable file of the application corresponding to the executable file identifier comprises one of a plurality of executable files stored in the repository for the application, each of the plurality of executable files being associated with a different type of heterogeneous device available in the hybrid cloud.

11. An electronic device for executing an application in a hybrid cloud, the electronic device comprising:
   a processor; and
   a memory having computer program instructions stored thereon, the processor executing the computer program instructions in the memory to control the electronic device to perform actions comprising:
   in response to receiving a request for executing the application from a user, obtaining an application identifier for the application from the request;
   determining, based on the application identifier and a scheduling strategy associated with the application, an executable file identifier corresponding to the application; and
   obtaining, from a repository associated with the hybrid cloud, an executable file of the application corresponding to the executable file identifier, the executable file being associated with a type of a heterogeneous device in the hybrid cloud;

wherein determining the executable file identifier comprises:
  determining, based on the application identifier and the scheduling strategy, a cloud identifier and a device identifier from metadata, the metadata comprising the application identifier, the cloud identifier, the device identifier and information related to at least one of device performance, a usage cost, and security; and
  determining the executable file identifier from the repository based on the application identifier, the cloud identifier and the device identifier.

12. The electronic device of claim 11, wherein the actions further comprise:
  deploying the executable file into a heterogeneous device in the hybrid cloud to obtain an execution result snapshot of the application; and
  determining an output of the application based on an initial snapshot of the application and the execution result snapshot of the application.

13. The electronic device of claim 11, wherein the actions further comprise:
  in response to an application installation request from a user, obtaining source code of the application;
  obtaining a type of the heterogeneous device in the hybrid cloud from configuration information of the hybrid cloud;
  generating, based on the type of the heterogeneous device and from the source code, the executable file corresponding to the type of the heterogeneous device; and
  storing the executable file in the repository.

14. The electronic device of claim 13, wherein storing the executable file in the repository comprises:
  storing the executable file in the repository in association with at least one of the application identifier, the executable file identifier, the cloud identifier and the device identifier.

15. The electronic device of claim 13, wherein the actions further comprise:
  in response to the generation of the executable file, storing the metadata of the application in a metadata storage of a hybrid cloud tool, the metadata comprising the application identifier, the cloud identifier, the device identifier and the information related to at least one of device performance, a usage cost, and security.

16. The electronic device of claim 11, wherein the actions further comprise:
  verifying the user based on account information of the user and the application identifier.

17. The electronic device of claim 11, wherein the actions further comprise:
  determining a current scheduling strategy based on at least one of a scheduling strategy previously used for the application by the user and a scheduling strategy used for the application by a further user.

18. A computer program product being tangibly stored on a non-volatile computer readable medium and comprising machine-executable instructions which, when executed, cause a machine to perform steps of a method of executing an application in a hybrid cloud, comprising:
  in response to receiving a request for executing the application from a user, obtaining an application identifier for the application from the request;
  determining, based on the application identifier and a scheduling strategy associated with the application, an executable file identifier corresponding to the application; and
  obtaining, from a repository associated with the hybrid cloud, an executable file of the application corresponding to the executable file identifier, the executable file being associated with a type of a heterogeneous device in the hybrid cloud;
  wherein determining the executable file identifier comprises:
    determining, based on the application identifier and the scheduling strategy, a cloud identifier and a device identifier from metadata, the metadata comprising the application identifier, the cloud identifier, the device identifier and information related to at least one of device performance, a usage cost, and security; and
    determining the executable file identifier from the repository based on the application identifier, the cloud identifier and the device identifier.

19. The computer program product of claim 18, further comprising:
  deploying the executable file into a heterogeneous device in the hybrid cloud to obtain an execution result snapshot of the application; and
  determining an output of the application based on an initial snapshot of the application and the execution result snapshot of the application.

20. The computer program product of claim 18, further comprising:
  in response to an application installation request from the user, obtaining source code of the application;
  obtaining a type of the heterogeneous device in the hybrid cloud from configuration information of the hybrid cloud;
  generating, based on the type of the heterogeneous device and from the source code, the executable file corresponding to the type of the heterogeneous device; and
  storing the executable file in the repository.

* * * * *